Nov. 1, 1938.  W. REESE  2,134,841
ARTIFICIAL FISHING BAIT
Original Filed July 15, 1936

Inventor
WALTER REESE

By Irving L. McCathran
Attorney

Patented Nov. 1, 1938

2,134,841

UNITED STATES PATENT OFFICE 2,134,841

ARTIFICIAL FISHING BAIT

Walter Reese, Gary, Minn.

Application July 15, 1936, Serial No. 90,763
Renewed March 28, 1938

4 Claims. (Cl. 43—36)

This invention relates to an artificial fishing bait or lure, sometimes referred to as a fish plug, and has for one of its principal objects the production of a simple and efficient means for facilitating the gripping of a fish after it has once become hooked by contact with the baiting hook.

A further object of this invention is the production of a simple and efficient artificial fishing bait or lure, the hook of which will automatically grip into the jaws of the fish as soon as the fish trips the baited hook.

Other objects and advantages of the present invention will appear throughout the following specification and claims.

Figure 1:
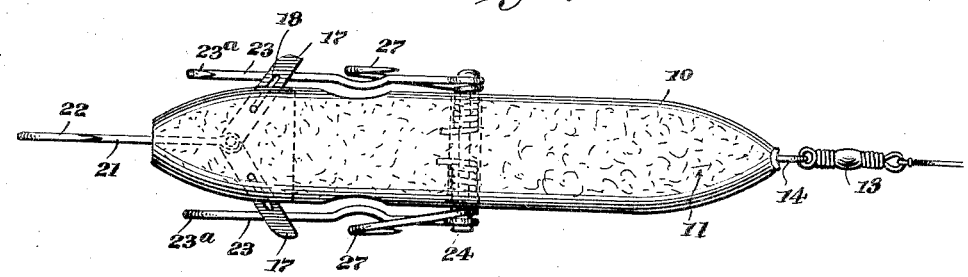
Figure 1 is a top plan view of the improved fish plug or artificial fishing bait or lure.

By referring to the drawing, it will be seen that 10 designates the body of the fishing lure which is preferably of an elongated structure, but which may be of any suitable or desired type or design without departing from the spirit of the invention. The body 10 is preferably painted grey or some other neutral or relatively dark color on the top half, as indicated by the numeral 11, and white on the belly, as indicated by 12.

The body 10 may be secured to a line 13, through the medium of a suitable securing eye 14 mounted at the end of the body. A depending hook 15 is preferably suspended centrally from the bottom face of the body adjacent the forward end.

The body 10 is slotted at its rear end, as indicated at 16, within which slotted end are mounted the diverging links 17, which links 17 are slotted, as at 18, the sliding movement of the links being limited by means of the securing pins 19. The rear ends of the links 17 are pivotally connected together, as at 20, and are also secured to the inner end of the bait hook 21 which projects rearwardly from the body 10, and is preferably turned upwardly at its point 21a—note Figure 2. The body 10 adjacent the slotted portion 16 is preferably enlarged and dished, as at 22, to accommodate the pivot connection 20. The forward ends of the links 17 diverge outwardly and when the hook 21 is forced inwardly, the inner ends of the links 17 will be spread apart and extended beyond the sides of the body 10 in a position such as is shown in Figure 1.

A pair of jaw-engaging hooks 23 are carried by the body, one hook being placed upon each side of the body and are journaled upon the transversely extending journal pin 24, which journal pin 24 is located midway of the body. A coil spring 25 is wound about the pin 24 and extends through the transversely extending enlarged aperture 26, the ends of the spring 25 terminating in forwardly extending hooks 27 to provide additional snares. The jaw-engaging hooks 23, however, normally lie longitudinally of the body 10 when in an inactive position, and are engaged by the protruding ends of the links 17 in the manner as shown in Figure 1, whereby these jaw-engaging hooks 23 will be held in a latched position. The ends of these hooks 23 are bent in opposite directions as indicated at 23a, one extending upwardly and the other extending downwardly, and the hooks are preferably crooked or bent inwardly, as at 30, the body being dished, as at 29, to allow the hooks to freely swing without rubbing against the body and to facilitate the baiting of the hooks 27, if desired. The hooks 27 are slightly shorter than the ends 23a of the hooks 23 as will be noted by considering Figure 2.

Figure 2:
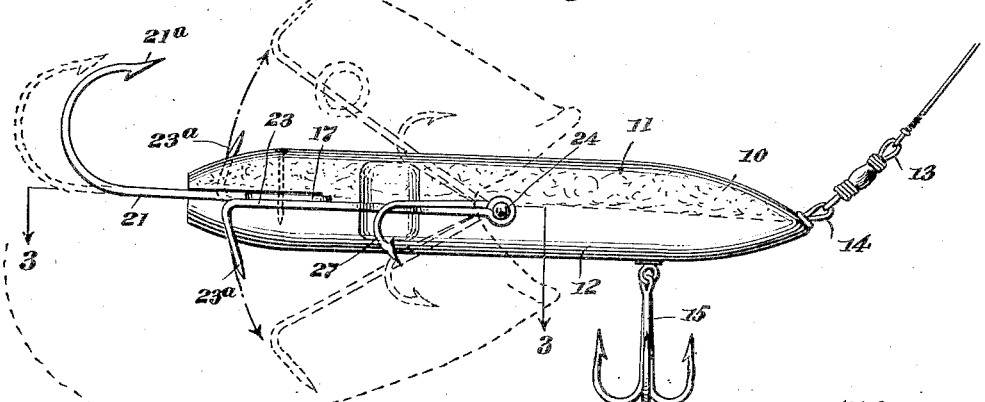
Figure 2 is a side elevation thereof.
Figure 3:
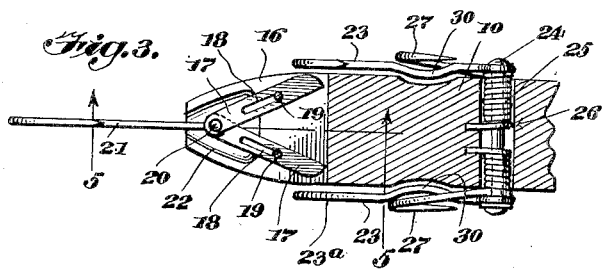
Figure 3 is a horizontal sectional view taken on line 3—3 of Figure 2.
Figure 4:
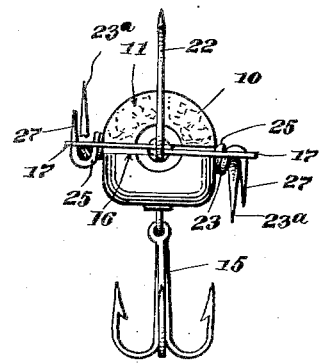
Figure 4 is a rear elevation of the improved fish plug, one of the jaw-engaging hooks being shown in transverse section.
Figure 5:
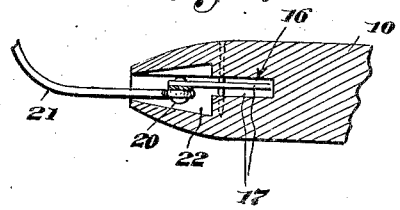
Figure 5 is a longitudinal section taken on line 5—5 of Figure 3.

The operation of the device is as follows:

The hook 21 is baited in the usual manner and as the fish attacks the bait, in the manner as shown in Figure 2 in dotted lines, the hook 21 will be drawn longitudinally thereby pulling the protruding ends of the links 17 within the slotted portion 16 of the body and releasing the jaw-engaging hooks 23, thereby causing the ends 23a of the hooks 23 to dig into the jaw of the fish thereby firmly holding the fish in engagement with the lure and preventing the accidental release of the fish.

From the foregoing description, it will be seen that a very simple and efficient means has been provided for automatically releasing the jaw-engaging hooks of the lure and causing these hooks to automatically grip the jaws of the fish for firmly holding the fish against accidental displacement or release from the lure. Furthermore, it will be seen that a very simple and efficient latching means is provided which is controllable by the baited hook for holding the jaw-engaging hooks in a set position whereby upon movement of the baited hook, the jaw-engaging hooks will be immediately released, the tension of the spring 25 causing the jaw-engaging hooks to automatically dig into the jaw of the fish.

Certain detail changes in the mechanical construction may be employed without departing from the spirit of the invention, so long as such changes fall within the scope of the appended claims.

Having described the invention, what I claim as new is:

1. An artificial bait comprising a body slotted at one end, a pair of diverging latching links slidably mounted within said slotted end and movable to and from an extended position beyond the sides of said body, a bait hook connected to said links for drawing said links to a position within said body when said bait hook is engaged by a fish, jaw-engaging hooks pivotally mounted upon said body and engageable by said latching links when said latching links are in an extended position for holding said jaw-engaging hooks longitudinally of said body and in a shielded position, and spring means engaging said jaw-engaging hooks for automatically swinging said last mentioned hooks outwardly when released by said latching links whereby said last mentioned hooks will engage the jaws of a fish and firmly hold the fish in snared engagement.

2. An artificial bait comprising a body which is slotted at one end, a pair of diverging latching links slidably mounted within said slotted end and movable to and from an extended position beyond the sides of said body, a bait hook connected to said links for drawing said links to a position within said body when said bait hook is engaged by a fish, jaw-engaging hooks pivotally mounted upon said body and engageable by said latching links when said latching links are in an extended position for holding said jaw-engaging hooks longitudinally of said body and in a shielded position, and spring means engaging said jaw-engaging hooks for automatically swinging said last mentioned hooks outwardly when released by said latching links whereby said last mentioned hooks will engage the jaws of a fish and firmly hold the fish in snared engagement, and the ends of said spring means constituting snare hooks adjacent said jaw-engaging hooks.

3. An artificial bait comprising a body which is slotted at one end, a pair of diverging latching links slidably mounted within said slotted end and movable to and from an extended position beyond the sides of said body, a bait hook connected to said links for drawing said links to a position within said body when said bait hook is engaged by a fish, jaw-engaging hooks pivotally mounted upon said body and engageable by said latching links when said latching links are in an extended position for holding said jaw-engaging hooks longitudinally of said body and in a shielded position, and spring means engaging said jaw-engaging hooks for automatically swinging said last mentioned hooks outwardly when released by said latching links whereby said last mentioned hooks will engage the jaws of a fish and firmly hold the fish in snared engagement, the ends of said spring means constituting snare hooks adjacent said jaw-engaging hooks, the jaw-engaging hooks being bent inwardly intermediate their ends and adjacent the forward ends of the snare hooks and the body being dished upon its sides to provide a clearance for this inwardly bent portion.

4. An artificial bait comprising a body, latching means comprising laterally spreading links carried by said body and movable to and from an extended position beyond the sides of said body, a bait hook connected to said latching means for drawing said latching means to a position within said body when said bait hook is engaged by a fish, jaw-engaging hooks pivoted upon said body and engageable by said latching means when said latching means is extended beyond said body to engage said jaw-engaging hooks for holding said jaw-engaging hooks longitudinally of said body and in a shielded position, and spring means engaging said jaw-engaging hooks for automatically swinging said jaw-engaging hooks outwardly when released by said latching means.

WALTER REESE.